(12) United States Patent
Beyer et al.

(10) Patent No.: US 6,791,997 B2
(45) Date of Patent: Sep. 14, 2004

(54) SYSTEM AND METHOD FOR COLLISION-FREE TRANSMISSION SCHEDULING USING NEIGHBORHOOD INFORMATION AND ADVERTISED TRANSMISSION TIMES

(75) Inventors: David Beyer, Los Altos, CA (US); Jose J. Garcia-Luna-Aceves, San Mateo, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/228,173

(22) Filed: Aug. 26, 2002

(65) Prior Publication Data

US 2003/0067892 A1 Apr. 10, 2003

Related U.S. Application Data

(60) Provisional application No. 60/314,867, filed on Aug. 25, 2001.

(51) Int. Cl.[7] .......................... H04L 12/413; H04Q 7/20
(52) U.S. Cl. ........................................ 370/447; 370/461
(58) Field of Search ................................ 370/336, 442, 370/447, 448, 461, 252, 254, 255

(56) References Cited

U.S. PATENT DOCUMENTS

| | | | |
|---|---|---|---|
| 5,412,654 A | 5/1995 | Perkins | 370/94.1 |
| 5,517,504 A * | 5/1996 | Tran et al. | 370/347 |
| 5,745,483 A | 4/1998 | Nakagawa et al. | 370/335 |
| 5,936,962 A * | 8/1999 | Haddock et al. | 370/446 |
| 5,987,011 A | 11/1999 | Toh | 370/331 |
| 6,067,291 A | 5/2000 | Kamerman et al. | 370/338 |
| 6,240,080 B1 * | 5/2001 | Okanoue et al. | 370/338 |
| 6,304,556 B1 | 10/2001 | Haas | 370/254 |
| 6,381,250 B1 | 4/2002 | Jacobson et al. | 370/468 |
| 6,456,599 B1 * | 9/2002 | Elliott | 370/254 |
| 6,487,595 B1 * | 11/2002 | Turunen et al. | 709/226 |
| 6,498,790 B1 * | 12/2002 | Shaheen et al. | 370/347 |

* cited by examiner

*Primary Examiner*—Min Jung
(74) *Attorney, Agent, or Firm*—Darby & Darby PC; Matthew M. Gaffney

(57) ABSTRACT

The present invention provides a medium access control (MAC) protocol for the collision-free transmission of packets into a channel, such that nodes are assigned time slots for collision-free transmission based on the knowledge that they acquire regarding the constituency of their local neighborhoods and the advertisements of the time slots when nodes in local neighborhoods will attempt to transmit again.

The scheduling procedure may utilize an age of the network together with the unique identifiers of nodes. The candidate transmission times for each node are determined using a list of the subsequent transmission times advertised by other nodes. The node discards the advertised transmission times from the list of potential transmission times, and computes its candidate transmission times using a function that provides a varying (pseudorandom) distribution of outputs for a varying sample of inputs. This function ay be a hash function, an encryption function, or a table lookup function. The computation of the candidate transmission times uses the identifiers of those nodes for which no advertised transmission time has been obtained.

29 Claims, 9 Drawing Sheets

R: Router
IR: Internet Radio

| Syntax | Size | Notes |
|---|---|---|
| MSH-NCFG_Message_Format() { | | |
| 901 — Management Message Type = 42 | 8 bits | |
| 902 — NumNbrEntries | 5 bits | |
| 903 — NumBSEntries | 2 bits | |
| 904 — Embedded Packet Flag | 1 bits | 0 = Not present<br>1= present |
| 905 — Xmt Power | 4 bits | |
| 906 — Xmt Antenna | 3 bits | |
| 907 — NetEntry MAC Address Flag | 1 bits | 0= Not present<br>1= present |
| 908 — Network base channel | 4 bits | |
| 909 — Reserved | 4 bits | |
| 910 — NetConfig Count | 4 bits | |
| 911 — Timestamp<br>Frame Number<br>Network Control Slot Number in frame<br>Synchronization Hop Count | 12 bits<br>4 bits<br>8 bits | See 8.3.3.5.2.1 |
| 912 — NetConfig schedule info<br>Next Xmt Mx<br>Xmt Holdoff Exponent | 3 bits<br>5 bits | |
| 913 — NetEntry MAC Address | 48 bits | If NetEntry MAC Address Flag = 1 |
| for (i=0; i< NumBSEntries; ++i) { | | |
| BS Node H) | 16 bits | |
| 914 — Number of hops | 3 bits | |
| 915 — Xmt energy/bit | 5 bits | |
| | | |
| for (i=0; i< NumNbrEntries; ++i) { | | |
| 916 — Nbr Node ID | 16 bits | |
| MSH-Nbr_Physical_IEQ | 16 bits | |
| MSH-Nbr_Logical_IEQ | 16 bits | If Logical Link Info Present Flag = I |
| | | |
| MSH-NCFG_embedded_dataQ | variable | If Embedded Packet Flag = 1 |

*Fig.9*

SYSTEM AND METHOD FOR COLLISION-FREE TRANSMISSION SCHEDULING USING NEIGHBORHOOD INFORMATION AND ADVERTISED TRANSMISSION TIMES

RELATED APPLICATION

This application claims the benefit of U.S. Provisional Application No. 60/314,867 filed Aug. 25, 2001, the benefit of the earlier filing date of which is hereby claimed under 35 U.S.C. § 119(e).

FIELD OF THE INVENTION

The present invention relates to the scheduling of transmissions without collisions in ad hoc networks in which routers can move and have both hosts and networks attached to them.

BACKGROUND OF THE INVENTION

Many medium-access control (MAC) protocols have been developed for wireless networks. The carrier-sense multiple access (CSMA) protocol was the first to be used in multihop packet-radio networks. A limitation of CSMA in multihop networks is that sources hidden from one another cannot detect their transmissions, which degrades CSMA's performance to that of the pure ALOHA protocol. Many MAC protocols have been proposed and implemented to solve the hidden-terminal problems of CSMA. The throughput of CSMA protocols is very good, as long as the multiple transmitters within range of the same receivers can sense one another's transmissions. Unfortunately, "hidden terminal" problems degrade the performance of CSMA substantially, because carrier sensing cannot prevent collisions in that case.

The busy tone multiple access (BTMA) protocol (F. A. Tobagi and L. Kleinrock, "Packet switching in radio channels: Part II—the hidden terminal problem in carrier sense multiple-access modes and the busy-tone solution," IEEE Trans. Commun., vol. COM-23, no. 12, pp. 1417–1433, 1975.) was the first proposal to combat the hidden-terminal problems of CSMA. BTMA is designed for station-based networks and divides the channel into a message channel and the busy-tone channel. The base station transmits a busy-tone signal on the busy-tone channel as long as it senses carrier on the data channel. Because the base station is in line of sight of all terminals, each terminal can sense the busy-tone channel to determine the state of the data channel. The limitations of BTMA are the use of a separate channel to convey the state of the data channel, the need for the receiver to transmit the busy tone while detecting carrier in the data channel, and the difficulty of detecting the busy-tone signal in a narrow-band channel.

A receiver initiated busy-tone multiple access protocol for packet-radio networks has also been proposed (C. Wu and V. O. K. Li, "Receiver-initiated busy-tone multiple access in packet radio networks," ACM SIGCOMM 87 Workshop: Frontiers in Computer Communications Technology, Stowe, Vt., USA, 11–13 August 1987). In this scheme, the sender transmits a request-to-send (RTS) to the receiver, before sending a data packet. When the receiver obtains a correct RTS, it transmits a busy tone in a separate channel to alert other sources that they should back off. The correct source is always notified that it can proceed with transmission of the data packet. The limitations of this scheme are that it still requires a separate busy-tone channel and full-duplex operation at the receiver.

Several protocols have been proposed based on different types of "collision-avoidance" handshakes done with small control packets and meant to avoid data collisions when sources of data packets cannot hear one another. The collision-avoidance approach in the prior art follows the basic philosophy first introduced by Tobagi and Kleinrock in the Split-Channel Reservation Multiple Access (SRMA) protocol (F. A. Tobagi and L. Kleinrock, "Packet switching in radio channels: Part III—polling and (dynamic) split-channel reservation multiple access," IEEE Trans. Commun., vol. COM-24, no. 8, pp. 832–845, 1976). In SRMA, and most subsequent collision-avoidance protocols, a sender node sends a request-to-send (RTS) packet to the intended receiver, either sensing the channel before sending the RTS or not sensing the channel before the RTS transmission. A receiver that hears a clean RTS responds with a clear-to-send (CTS), and the sender can send a data packet after hearing a clean CTS.

U.S. Pat. No. 5,319,641 assigned to Echelon Systems Corp. discloses a method to improve CSMA p-persistent protocols by introducing a random waiting time that stations must wait listening to the channel once they have packets to send. The method disclosed does not work in networks with hidden terminals.

U.S. Pat. No. 4,661,902 assigned to Apple Computer, Inc. discloses a method that amounts to an implementation of SRMA over a single channel in which stations use carrier sensing before sending RTSs.

MACA (P. Karn, "MACH—a new channel access method for packet radio," in ARRL/CRRL Amateur Radio 9th Computer Networking Conference, pp. 134–40, ARRL, 1990) includes a technique that amounts to SRMA running over a single channel in which a request-to-send (RTS) packet is sent without carrier sensing. There is no description of how to support packet trains.

U.S. Pat. No. 5,231,634 assigned to Proxim, Inc. discloses a method that also applies SRMA's basic approach over a single channel. The RTS specifies the length of the impending data packet.

U.S. Pat. No. 5,502,724 assigned to International Business Machines Corporation discloses a method that extends the collision avoidance handshake to allow for multiple data packets to flow among a pair of communicating stations. A station that intends to establish a connection with a second station senses the channel. If the channel is idle, it sends a connection request (CR) packet to the intended receiver station. The CR specifies the number of data packets that the connection includes. The intended receiver sends a connection confirm (CC) packet to the sending station; the CC also specifies the number of packet in the connection. After the exchange of correct CR and CC packets the sending station may send one or multiple data packets and the receiving station may send an acknowledgment packet specifying which data packets were received correctly. To end the connection, the sending station sends a disconnect request (DR) and the receiving station issues a disconnect confirm (DC). Stations that receive a CR packet back off for an amount of time that is long enough for the advertised number of data packets to be sent to the receiver. After receiving a CR or CC, a station can attempt to access the channel when a timer proportional to the number of packets to be sent in the connection expire, or when it receives a DR or DC packet. The limitation with the method disclosed in U.S. Pat. No. 5,502,724 is that the method cannot ensure collision-fee transmissions of data packets, even with the transmission of CC packets by the receiver. The need for feedback from the receiver to its neighbors on a packet-by-packet basis was demonstrated by Fullmer and Garcia-Luna-Aceves (C. L. Fullmer and J. J. Garcia Luna-Aceves, "Solutions to Hidden Terminal Problems in Wireless Networks", Proc. ACM SIGCOMM 97, Cannes, France, Sep. 14–18, 1997). Because the CC packet sent by the receiver may collide with another packet at a neighbor of a receiver, the CC packet does not provide sufficient feedback to hidden nodes; furthermore, the need for feedback packets to be longer than request packets was also demonstrated by Fullmer and Garcia-Luna-Aceves (C. L. Fullmer and J. J. Garcia-Luna-Aceves, "Floor Acquisition Multiple Access (FAMA) for Packet-Radio Networks," Proc. ACM SIGCOMM 95, Cambridge, Mass., Aug. 28–Sep. 1, 1995). In addition, even though the disclosed method makes reference to broadcast packets sent to all the neighbors of a station, it provides no provisions to ensure that broadcast or multicast packets are received without interference by all the neighbors of a sending station.

U.S. Pat. No. 5,721,725 assigned to Xerox Corp. discloses a method similar to SRMA, and describes it to be an improvement over MACH. The method disclosed extends MACH by specifying in the RTS packets the desired data rate for data packets and allowing sender and receiver to negotiate the transmission data rate. This method fails to guarantee collision free transmissions in networks with hidden terminals because no provisions are made on the length of the CTS being longer than the length of any RTS to ensure that collisions of RTSs and CTSs are detected by hidden stations.

DFWMAC IEEE802.11 (K. C. Chen, "Medium Access Control of Wireless LANs for Mobile Computing," IEEE Network, vol. 8, no. 5, pp. 50–63, 1994), FAMA-NCS (C. L. Fullmer and J. J. Garcia-Luna-Aceves, "Solutions to Hidden Terminal Problems in Wireless Networks", Proc. ACM SIGCOMM 97, Cannes, France, Sep. 14–18, 1997), and RIMA (J. J. Garcia-Luna-Aceves and A. Tzamaloukas, "Reversing the Collision Avoidance Handshake in Wireless networks," Proc. ACM/IEEE Mobicom 99, August 1999) are three recent additional examples of collision-avoidance protocols. IEEE 802.11 is a method very similar to SRMA with carrier sensing for the transmission of RTSs. The objective of FAMA-NCS is for a station that has data to send to acquire control of the channel in the vicinity of the receiver (which we call "the floor") before sending any data packet, and to ensure that no data packet collides with any other packet at the receiver. FAMA-NCS makes the length of CTSs much longer than the length of RTSs in order to detect the collision of RTSs with CTSs, which cannot be enforced in prior collision-avoidance protocols. RIMA includes a family of protocols that reverse the collision-avoidance handshake method first introduced in SRMA and makes the receiver polls the sender of data. Several other medium access control (MAC) protocols have been proposed for either single-channel wireless networks or wireline local area networks that are based on similar RTS-CTS exchanges, or based on RTSs followed by pauses. However, despite the popularity gained by collision-avoidance protocols and systems based on such protocols over the past few years, two key performance limitations of all collision-avoidance MAC protocols are that: (a) they cannot provide channel-access delay guarantees, which represents a big problem for real-time applications; and (b) they lack explicit support of collision-free multicasting or broadcasting, which implies that either a node must transmit the same multicast packet multiple times, once to each multicast-group neighbor, or packets are sent with likelihood of reception as low as the ALOHA protocol. In addition, collision-avoidance protocols require carrier sensing, which is not technically or economically feasible to implement correctly in direct sequence spread spectrum radios with very high chip rates.

To circumvent hidden-terminal interference problems, unique codes (spreading codes or frequency-hopping sequences) can be assigned to receivers or senders.

An example of this approach was the Metricom network. However, receiver oriented code assignment (ROCA) and transmitter oriented code assignment (TOCA) require either pre-configuring radios with the node to code mappings, or finding the codes being used by neighboring transmitters or receivers. Furthermore, efficient broadcasting is not guaranteed simply by establishing a TOCA approach; because all the neighbors of a transmitter must agree to listen to the transmitter at the same time to minimize the number of transmissions.

Another approach to channel access used in multihop wireless networks includes establishing transmission schedules, i.e., allocating stations to different times and data channels (e.g., frequencies, spreading codes, or their combination) in a way that no collisions occur. Transmission scheduling can be static or dynamic; MAC protocols based on dynamic transmission scheduling explore the spatial reuse of the radio channel and thus have much higher channel utilization than such fixed scheduling approaches as TDMA and FDMA.

In TDMA protocols, time is divided into frames comprising time slots. Time slots are allocated to specific nodes or a centralized station is used to allocate the time slots. The limitations of TDMA stem from the fixed assignment of time slots to nodes, which are slow to adapt to network changes and makes inefficient use of the channel if nodes are bursty sources of traffic, and the use of centralized assignments.

There are many approaches in the prior art based on dynamic TDMA methods in which stations use ALOHA, slotted ALOHA or other contention protocols in an uplink to request time slots from a base station. An example of this approach is the system disclosed in U.S. Pat. No. 5,638,371 assigned to NEC USA, Inc. The present invention eliminates the need for a base station to make slot assignments.

A number of protocols have been proposed in the recent past to provide dynamic time-slot allocation without requiring central base stations. These protocols can be classified as topology-independent and topology-dependent time scheduling protocols.

Shepard (T. Shepard, "A Channel Access Scheme for Large Dense Packet Radio Networks," Proc. SIGCOMM '96, 1996; T. Shepard, "Scalable, Self-Configuring Packet Radio Network Having Decentralized Channel Management Providing Collision-Free Packet Transfer," U.S. Pat. No. 5,682,382, Oct. 28, 1997), Chlamtac et al (I. Chlamtac et al, "Time-Spread Multiple-Access (TSMA) Protocols for Multihop Mobile Radio Networks," IEEE/ACM Transactions on Networking, 'Vol. 5, no. 6, December 1997), and Ju and Li (Ji-Her Ju, Victor O. K. Li, "An Optimal Topology-Transparent Scheduling Method in Multihop Packet Radio Networks," IEEE/ACM Transactions on Networking, Vol. 6, no. 3, June 1998) have proposed topology-independent time-scheduling protocols. In these protocols, nodes are pre-assigned (by means of their nodal IDs, for example) or adopt a transmission schedule that they publish, and such a schedule specifies the times when a node transmits and receives. The protocols guarantee or provide a high likelihood that at least one transmission time in a node's schedule does not conflict with any node one or two hops away. In the Chlamtac and Ju approaches, nodes are unable to determine which transmissions will succeed, complicating the job of higher layer (e.g., link-layer) protocols. These approaches also require values for the total number of nodes in the network and maximum number of neighbors for each node, as input parameters to the algorithm, thus making them design for the worst case conditions (and thus, inefficient if the network is not as dense as expected), or being sensitive to actual network conditions (if the network is larger or more dense than expected). Shepard's approach avoids collisions by assuming nodes are synchronized with their neighbors, have knowledge of their neighbors' schedules, and are able to receive from multiple transmitting neighbors simultaneously. This final assumption requires fairly sophisticated radio hardware.

Zhu and Corson (C. Zhu, M. S. Corson, "A Five-Phase Reservation Protocol (FPRP) for Mobile Ad Hoc Networks," Proc. IEEE INFOCOM '98) and Tang and Garcia-Luna Aceves (Z. Tang and J. J. Garcia-Luna-Aceves, "A Protocol for Topology-Dependent Transmission Scheduling," Proc. IEEE Wireless Communications and Networking Conference 1999 (WCNC 99), New Orleans, La., Sep. 21–24, 1999; Z. Tang and J. J. Garcia-Luna-Aceves, "Hop-Reservation Multiple Access (HRMA) for Multichannel Packet Radio Networks", Proc. IEEE IC3N '98: Seventh International Conference on Computer Communications and Networks, Lafayette, La., Oct. 12–15, 1998) have developed topology-dependent scheduling protocols, such that a node acquires a transmission schedule that allows the node to transmit without interfering with nodes one and two hops away from itself, and such that channel reuse is increased as the number of neighbors per node decreases. These protocols require nodes to contend in order to reserve collision-free time slots, and the contention is done on each mini-slot. Furthermore, they rely on dividing each slot into several mini-slots. All this limits the minimum duration that slots may have. The present invention does not require slots to be subdivided, and does not require nodes to reply to neighbors in less than a frame time.

Several approaches have been proposed that are based on TDMA and require an initial, topology-independent schedule, followed by communication among the network nodes to negotiate a final schedule. Chlamtac (I. Chlamtac, "Fair Algorithms for Maximal Link Activation in Multihop Radio Networks," IEEE Transactions on Communications, Vol. COM-35, no. 7, July, 1987) proposed an algorithm based on a repeating link schedule that can adapt to traffic demands after some number of iterations of the algorithm. The algorithm starts with a "single-slot-per-link" schedule, such as provided by assigning each node a transmission slot according to its node ID. At each iteration, schedule information and a scheduling "token" are routed up and down a routing tree (established by means of pre-existing algorithms), to assign additional slots to nodes or links according to their degree of unmet traffic demands. Ephremides and Truong (A. Ephremides, T. Truong, "Scheduling Broadcasts in Multihop Radio Networks," IEEE Transactions on Communications, Vol. COM-38, No. 4, April, 1990) proposed a similar algorithm in which each node is initially assigned a slot corresponding to its node ID, and then each node uses their assignment to pass "skeleton" schedules to their neighbors. During the next two frames (two iterations of communicating schedules), and in accordance with fixed node priorities, nodes are able to grab available slots until all available slots are taken (i.e., no more slots can be assigned without causing collisions). Because of the need for sched-ules that are fixed, requiring a few iterations to converge, and of scheduling-frame size equal to the maximum size of the network, these approaches have limited scalability and robustness to mobility or other dynamics. The approach proposed by Young (C. D. Young, "USAP: A Unifying Dynamic Distributed Multichannel TDMA Slot Assignment Protocol," Proc. IEEE MILCOM 96 OCTOBER 1996) also requires initial assignment of one slot per node, and then negotiation of scheduling packets for assignment of the other slots. However, the initially assigned slot is limited to the first slot in each "frame." Thus, each node's assigned slot occurs every N frames, where N is the maximum network size. Because of this, the approach does not scale. Also, the approach is relatively slow in adapting to dynamic traffic conditions, because a node needs to wait up to N frames before a proposed schedule addition is confirmed by a neighbor.

The majority of the limitations described above for the MAC protocols in the prior art are eliminated with the Robust Environmentally Adaptive Link/MAC (REALM) protocol (D. Beyer, J. J. Garcia-Luna-Aceves, and C. Fullmer, "Adpative Communication Protocol for Wireless Networks," U.S. patent application Ser. No. 09/248,738, Feb. 10, 1999, in combination with the Neighborhood Established Transmission Scheduling (NETS) protocol (J. J. Garcia-Luna-Aceves, D. Beyer and C. Fullmer, "A Protocol for Neighborhood Established Transmission Scheduling," Ser. No. 09/418,899, Oct. 15, 1999).

REALM is a MAC protocol that achieves collision avoidance without the need for handshakes between senders and receivers. REALM assumes a synchronous network organized into time frames divided into slots. The amount of synchronization assumed in REALM is the same type of synchronization required in any network operating with frequency hopping radios, such as those designed to operate in ISM bands and commercially available today. A node running REALM must know the identities of its one-hop and two-hop neighbors and the present time in the network (e.g., the number of the current frame). Based on this information, and auxiliary information, each node evaluates a function (e.g., a hash function) that specifies deterministically which node should transmit in which time slot of a frame. REALM achieves fairness by changing in each frame the priority with which a given node can transmit in a time slot of the frame. Once all the nodes in the two-hop neighborhood of a node have consistent information regarding their neighborhood, collisions are avoided because all the nodes use the same deterministic algorithm to select a winner for a given time slot.

Bao and Garcia-Luna-Aceves (L. Bao and J. J. Garcia-Luna-Aceves, "A New Approach to Channel Access Scheduling for Ad Hoc Networks," Proc. ACM MobiCom 2001—Seventh Annual International Conference on Mobile Computing and networking, Jul. 16–21, 2001, Rome, Italy; L. Bao and J. J. Garcia-Luna-Aceves, "Channel Access Scheduling in Ad Hoc Networks with Unidirectional Links," Proc. ACM DialM 2001—Fifth International Workshop on Discrete Algorithms and Methods for Mobile Computing and Communications, Jul. 21, 2001 Rome, Italy; L. Bao and J. J. GarciaLuna-Aceves, "A New Collision-Free Medium Access Control Protocol " Proc. IEEE MILCOM 2000, Los Angeles, Calif., Oct. 22–25, 2000.) have proposed channel access algorithms that achieve collision avoidance without the need for a specific handshake between sender and receiver in a way similar to REALM. These algorithms require each node to have the identifiers of all the nodes within two hops, and assign a transmission priority to a node during a given time slot based on this neighbor information. An unspecified algorithm is assumed to disseminate neighbor information.

A limitation of using REALM by itself or the algorithms proposed by Bao and Garcia-Luna-Aceves is that these approaches are based on all the nodes in a twohop neighborhood competing for transmission in each time slot of a frame designated for such type of collision-free access. A more efficient use of he channel can be achieved if those nodes that were able to transmit during a prior frame notify their neighborhoods that they will not be competing for transmission slots for a period of time, which effectively reduces competition among nodes and the delay experienced by a given node in accessing the channel.

SUMMARY OF THE INVENTION

The present invention is directed at addressing the above-mentioned shortcomings, disadvantages and problems, and will be understood by reading and studying the following specification.

The present invention includes a medium access control (MAC) protocol for the collision-free transmission of packets into a channel, such that nodes are assigned time slots for collision-free transmission based on information they acquire regarding the constituency of their local neighborhoods and the advertisements of the time slots when nodes in local neighborhoods will attempt to transmit again.

According to one aspect of the invention, the scheduling procedure may utilize an age of the network together with unique identifiers associated with the nodes.

According to another aspect of the invention, the candidate transmission times for each node are determined using a list of the subsequent transmission times advertised by other nodes. The node discards the advertised transmission times from the list of potential transmission times, and computes its candidate transmission times using a function that provides a varying (pseudorandom) distribution of outputs for a varying sample of inputs. This function may be a hash function, an encryption function, or a table-lookup function. The computation of candidate transmission times uses the identifiers of those nodes for which no advertised transmission time has been obtained.

BRIEF DESCRIPTION OF THE DRAWINGS

FIG. 9 illustrates the contents of a network configuration packet, in accordance with aspects of the invention.

DETAILED DESCRIPTION OF THE PREFERRED EMBODIMENT

Figure 1:
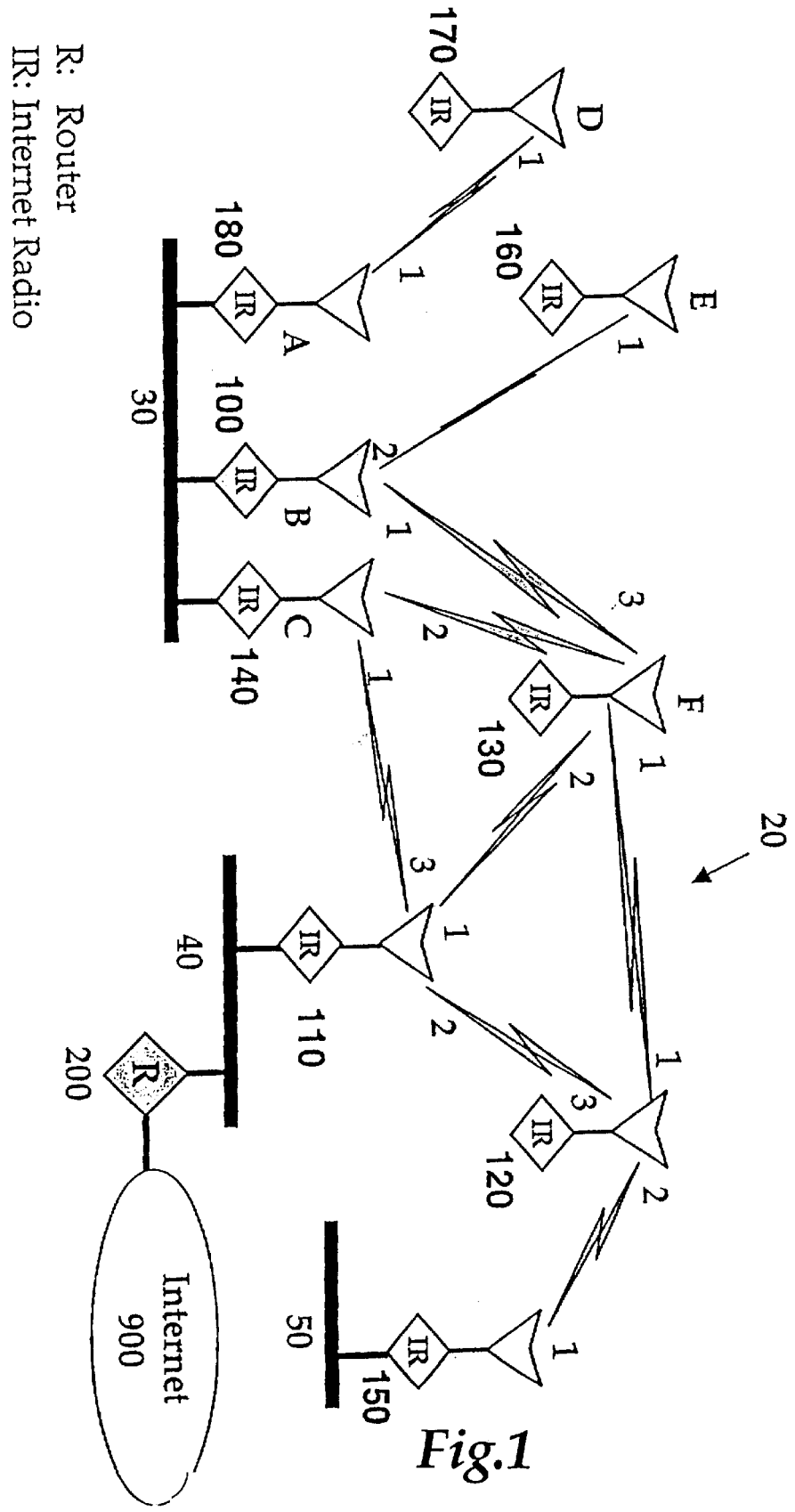
FIG. 1 illustrates an Ad hoc network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. Referring to the drawings, like numbers indicate like parts throughout the views. Additionally, a reference to the singular includes a reference to the plural unless otherwise stated or is inconsistent with the disclosure herein.

A system and method for the scheduling of transmissions in ad hoc networks will now be described. In the following description, numerous specific details are set forth in order to provide a thorough understanding of the present invention. However, it will be evident to those skilled in the art that these specific details need not be used to practice the present invention. In other cases, well-known structures and circuitry have not been shown in detail to avoid unnecessarily obscuring the present invention.

Briefly described, the present invention is directed at providing a medium access control (MAC) protocol for the collision-free transmission of packets into a channel, such that nodes are assigned time slots for collision-free transmission based on information they acquire regarding the constituency of their local neighborhoods and the advertisements of the time slots when nodes in local neighborhoods will attempt to transmit again.

I. Definitions, Basic Service and Assumptions

For purposes of the description, the radios used in the network are half-duplex and tune to one channel at a time, although the radios can switch to any of the available channels. Like previous MAC protocols based on transmission scheduling, the present invention assumes that time is slotted and that slots are grouped into frames. Frames are further organized into epochs. Note, however, that even protocols based on collision avoidance (e.g., IEEE 802.11) may require that time be slotted and organized into frames, depending on the radios used in the network. Such is the case for frequency hopping radios, because all radios must agree on the start times of frequency hops and the length of the hopping sequence.

The present invention focuses on the allocation of time slots for broadcast transmissions over a common channel, so that nodes can transmit control packets used for establishing transmission schedules over multiple data channels, or data packets. The present invention assumes bi-directional physical links among neighboring nodes; this is also true of collision-avoidance MAC protocols.

In an embodiment of the present invention, time slots are identified using a unique identifier specifying the position of the time slot in a frame and the position of a frame in an epoch. An epoch can be identified using the current time agreed upon among nodes by means of a time synchronization algorithm. In the description of the present invention, the term slot ID denotes the identifier of a time slot based on the "network age" of the network. Each epoch has a fixed number of frames and each frame has a fixed number of time slots.

The nodes executing the method described in the present invention are referred to as Internet Radios (IR). In the description of the invention, "node" and "Internet Radio" are used interchangeably.

In an embodiment of this invention, each neighbor of a node is identified by the node using a transmitter-assigned local link identifier, which we denote by XLID. In another embodiment of this invention, nodes can be identified by their MAC addresses. In the description of the present invention presented herein, we simply use the term node identifier to denote either XLIDs or MAC addresses of nodes. ATOM works correctly with both types of node identifiers. Each node can have up to a maximum of active one-hop neighbors. Each active one-hop neighbor is assigned a node identifier; and it is assumed that a node assigns consecutive node identifiers to active neighbors. The assignment of a node identifier to a neighbor is accomplished by means of a method that is outside the scope of the present invention.

FIG. 1 illustrates an exemplary Ad hoc network in which the invention may operate, in accordance with aspects of the invention. The ad hoc network consists of a number of subnetworks 20, 30, 40, and 50, which provide an extension of the Internet through a number of IRs (100, 110, 120, 130, 140, 150, 160, 170, and 180). Each IR, 100–180, is a wireless router with an IP address and a MAC address. Ad hoc network 20 attaches to the Internet 900 via access point IR 110. IR 110 is coupled to an Internet router 200 through local area network 40.

After a finite amount of time, the IRs (100–180) in ad hoc network 20 have the same list of IRs that are present in the network. In other words, the IRs are aware of its neighbors.

According to one embodiment of the invention, each IR learns the unique node IDs of the IRs within a predetermined number of hops away from it, which constitute its neighborhood. For example, IRs may learn of its neighbors that are one, two, three, or more hops away from it. According to one embodiment of the invention, an IR learns about the presence of its direct (1-hop) neighbors by means of a neighbor discovery and management protocol, possibly in combination with control packets. Two-hop neighbors and nodes beyond two hops from the node are learned by means of control packets.

Different protocols may be used for the communication of routing information throughout the ad hoc network.

II. Information Exchanged and Maintained

Figure 2:
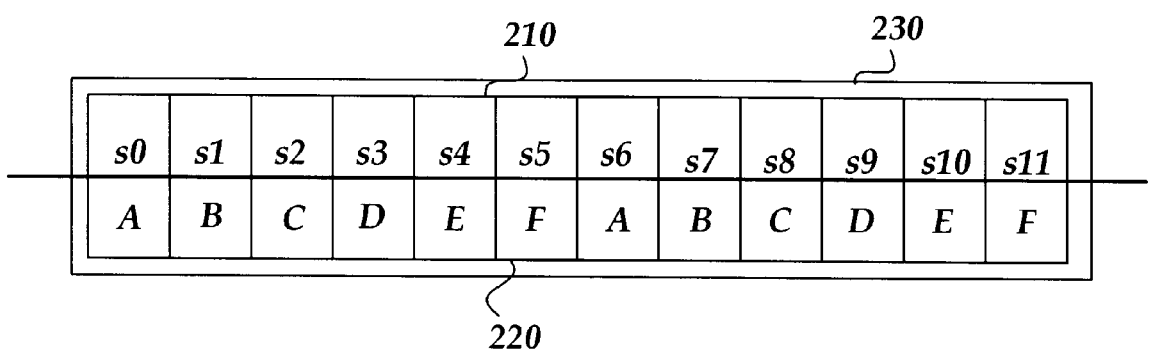
FIG. 2 illustrates an exemplary frame of time slots allocated for IRs A–E.

FIG. 2 illustrates an exemplary frame of time slots allocated for IRs A–E, in accordance with aspects of the invention. As illustrated, time slots 220 (s0–s11) are shown within frame 230. An IR is allocated to each time slot (See 220). For illustration purposes, IRs A–F have been placed in order under slots s0–s11. IRs A–F are assigned a time slot such that collisions are avoided. The IRs in the network are synchronized and agree on the periods, referred to as "frames," within which packets (e.g., control packets) will be scheduled. Each Frame is associated with a "Network Age" (NetAge) which changes from frame to frame, and is known throughout the network. For example, the network may be synchronized by epochs, frames, and slots, with a constant integer number (S) of slots per frame, and a constant integer number (F) of frames per epoch. Within each epoch, frames are numbered consecutively from 1 to F (the "Frame Number"). Epochs are also numbered consecutively, eventually wrapping back to Epoch Number 1 after E epochs. The above Network Age can either be the Frame Number concatenated with the epoch number, or simply just the Frame Number if the number of frames in an epoch is sufficiently large.

For the purposes of description, the control packets exchanged among nodes in the present invention are referred to as "network configuration packets."

According to one embodiment of the invention, each node maintains a physical neighborhood list with each entry containing the following fields:

Address 32-bit MAC address

Distance Indicates distance in hops of this neighbor from the present node. If a packet has been successfully received from this neighbor recently (defined further below), it is considered to be 1 hop away.

Node Identifier Number (or set of numbers) used to identify this node in a more efficient way in Network configuration packets.

For direct (1-hop) neighbors:
  Nbr ID—Number indicating the neighbor number which this node has assigned to this neighbor.

For indirect, 2-hop neighbors:
  Rep ID—Number indicating the neighbor that is reporting this 2-hop neighbor.
  Rep Nbr ID The Nbr ID used by the direct (reporting) neighbor to identify this 2-hop neighbor node.

For indirect, 3-hop neighbors (if maintained):
  Rep ID Number indicating the neighbor that is reporting this 3-hop neighbor.
  Rep Rep ID The Nbr ID used by the reporting neighbor to identify its reporting neighbor for this 3-hop neighbor node.
  Rep Rep Nbr ID The Nbr ID used by the direct neighbor to identify this 3-hop neighbor.

Xmt Holdoff Time The minimum number of frames between Network configuration packet transmissions by this node. A node can increase this holdoff time, and start reporting the increased number. To decrease its holdoff time, it must first advertise the new holdoff time for a given number of frames while using the old holdoff time before switching to the decreased time.

Next Xmt Time The frame & slot number before which this node is guaranteed not to transmit a Network configuration packet. This is initialized to NEXT_XMT_TIME_NOW. As part of the Aging procedure, and to avoid roll-over problems, this Next Xmt Time is also reset to this value whenever this Next Xmt Time plus the node's Xmt Holdoff Time is equal to or less than the current time.

Reported Flag Set to TRUE if this Next Xmt Time has been reported by this node in a Network configuration packet, otherwise set to FALSE.

Contents of Network Configuration Packet

FIG. 9 illustrates the contents of a network configuration packet, according to one embodiment of the invention.

Management Message Type 901 indicates the type of the message.

NumNbrEntries 902 is the number of neighbors reported on in the message. The number of neighbors reported on may be a fraction of the whole set of neighbors known to this node. A node can report on subsequent subsets of neighbors in its subsequent network configuration transmissions.

NumBSEntries 903 is the number of mesh BS neighbors reported on in this message.

Embedded Packet Flag 904 indicates whether there is an embedded packet within the network configuration packet.

Xmt Power 905 is in 2 dBm steps, starting from 8 dBm. (i.e. 1111 indicates 38 dBm).

Xmt Antenna 906 is the logical antenna used for transmission of this message. This allows for Adaptive Antenna Systems (AAS) support for up to 8 antenna directions.

NetEntry MAC Address Flag 907 indicates whether this entry is present or not.

Network base channel 908 is the base channel being used in this node's network, which is the logical number of the physical channel, which is used to broadcast schedule control information. A subset of the possible physical channel numbers is mapped to logical channels in the Network Descriptor.

Reserved field 909 is reserved.

Netconfig count 910 is the counter of network configuration packets transmitted by this node.

Timestamp 911 is used by neighbors to detect missed transmissions. This count is incremented by 1 for every network configuration transmission by this node. A synchronization hop count is used to determine superiority between nodes when synchronizing the network. Nodes can be assigned as master time keepers, which are synchronized externally (for example using GPS). These nodes transmit a Synchronization hop count of 0. Nodes synchronize to nodes with lower synchronization hop count, or if counts are the same, to the node with the lower Node ID.

Netconfig schedule info 912 is used to store the Next Xmt Mx and the Xmt Holdoff Exponent. The Xmt Holdoff Time is the number of network configuration transmit opportunities after Next Xmt Time (there are network configuration−1 opportunities per network control subframe that this node is not eligible not transmit network configuration packets.

Xmt Holdoff Time=$2^{(Xmt\ Holdoff\ Exponent+4)}$ The next Xmt Mx includes the Next Xmt Time which is the next network configuration eligibility interval for this neighbor and computed as the range $2^{XmtHoldoff\ Exponent}*$Next Xmt Mx<Next Xmt Time<$2^{XmtHoldoff\ Exponent}*$(Next Xmt Mx+1).

For example, if Next Xmt Mx=3 and Xmt Holdoff Exponent=4, then the node shall be considered eligible for its next network configuration transmission between 49 and 64 (due to the granularity) transmission opportunities away and ineligible before that time. If the Next Xmt Mx field is set to Ox1F (all ones), then the neighbor should be considered to be eligible to transmit from the time indicated by this value and every network configuration opportunity thereafter (i.e. treat Xmt Holdoff Time=0).

NetEntry MAC Address 913 indicates presence or sponsorship of new node. The BS node ID is the Node ID of the mesh BS node reported on.

Number of hops 914 is the number of hops between the reporting node and the reported mesh BS node.

Xmt energy/bit 915 factor is the indication of energy/bit needed to reach mesh BS through this node. Xmt energy/bit is computed as $E_i=\min/J\in N_i*[E_{j->i}+E_j]$ mW*μs, in which N is the set of neighbors reporting the mesh BS and $E_{1->j}=P_{Tx}/R_{i->j}$ in which $P_{Tx}$ is the transmission power in mW from node i to node j and $R_{i->j}$ is the datarate in Mbps from node i to node j. $E_j$ is the Xmt energy/bit reported by neighbor j. The reported Xmt energy/bit factor is the computed Xmt energy/bit divided by $2^{(XmtEnergyUnitExponent-4)}$. XmtEnergyUnitExponent is a 4-bit field reported in the Network Descriptor. Nbr node ID 916 is the Node ID of the neighbor node reported on.

According to another embodiment of the invention, a network configuration packet contains the following information:

| My MAC Adr | 32-bit MAC address (as part of TSync header) |
| Next Xmt Time | My Next Xmt Time |
| Xmt Holdoff Time | My Xmt Holdoff Time |

Each Network configuration packet also contains a list (length Y, TBD) of entries with the following fields. According to one embodiment of the invention, the list is selected in a round-robin manner from the node's 1-hop neighbors (and also among the 2-hop neighbors if in 3-hop-scheduling mode) neighbors. The list may be selected in other manners.

| Nbr MAC Adr | 32-bit MAC address |
| Distance | 1-hop (direct) neighbor or 2-hop neighbor |
| Node Identifier | Either (Nbr ID) or (Nbr ID and Rep ID) |
| Next Xmt Time | |
| Xmt Holdoff Time | |

Also, each Network configuration packet contains a list (length Z, TBD) of entries with the following compressed fields.

| Distance | 1-hop (direct) neighbor or 2-hop neighbor |
| Node Identifier | Either (Nbr ID) or (Nbr ID and Rep ID) |
| Next Xmt Time | |
| Xmt Holdoff Time | |

Figure 3:
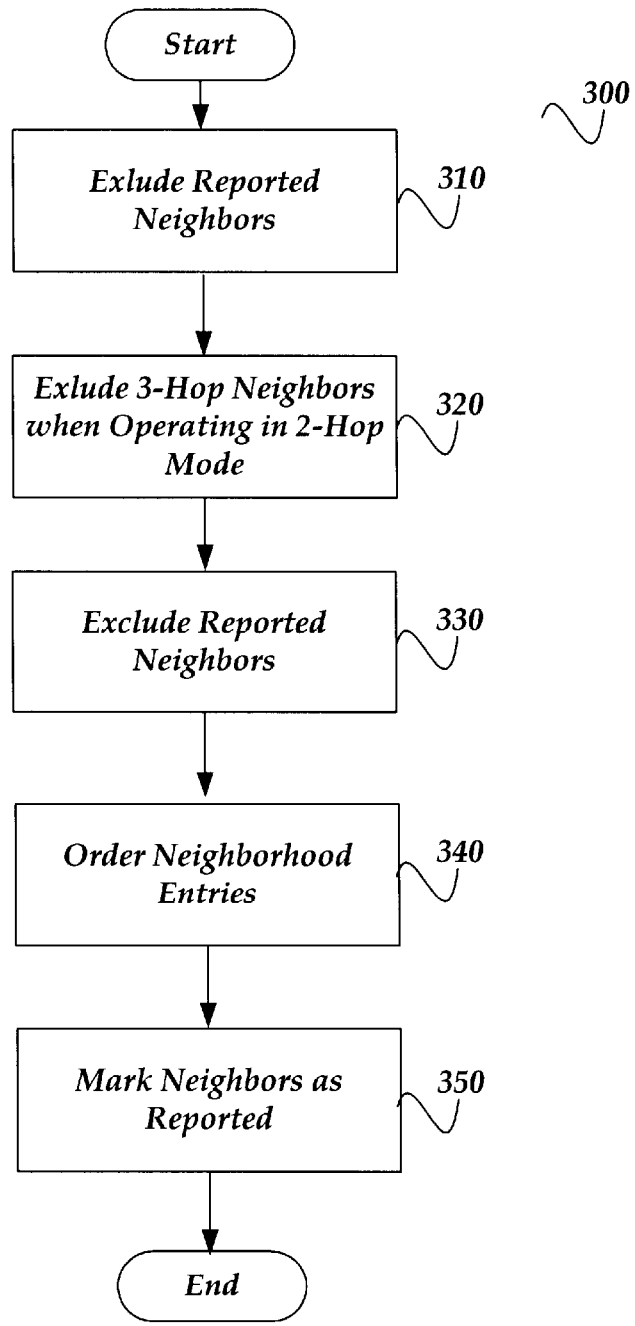
FIG. 3 illustrates a procedure used to select the list of physical neighbors to report in a compressed neighbor section of the Network configuration packet.

FIG. 3 illustrates a procedure used to select the list of physical neighbors to report in a compressed neighbor section of the Network configuration packet. After a start block, the logic flows to block 310 where neighbors reported in the round-robin list discussed above are excluded. Flowing to block 320, when operating in 2-hop-scheduling mode, all 3-hop neighbor entries are excluded. Next, at block 330, all neighbor entries with the "Reported Flag' set are excluded. Transitioning to block 340, the remaining neighbor entries are ordered by the Next Xmt Time, and the Z entries with the Next Xmt Time the furthest in the future are reported in this Network configuration packet. In general, learning of nodes with Next Xmt Times furthest into the future is more valuable than learning of nodes with Next Xmt Times approaching soon, since the neighbors will have more time to use this information before it's stale. Moving to block 350, the "Reported Flag" for all neighbors in either of the above lists is set to TRUE upon transmission of this Network configuration packet. The process then moves to an end block and returns to processing other actions.

III. Transmission Scheduling

Figure 4:
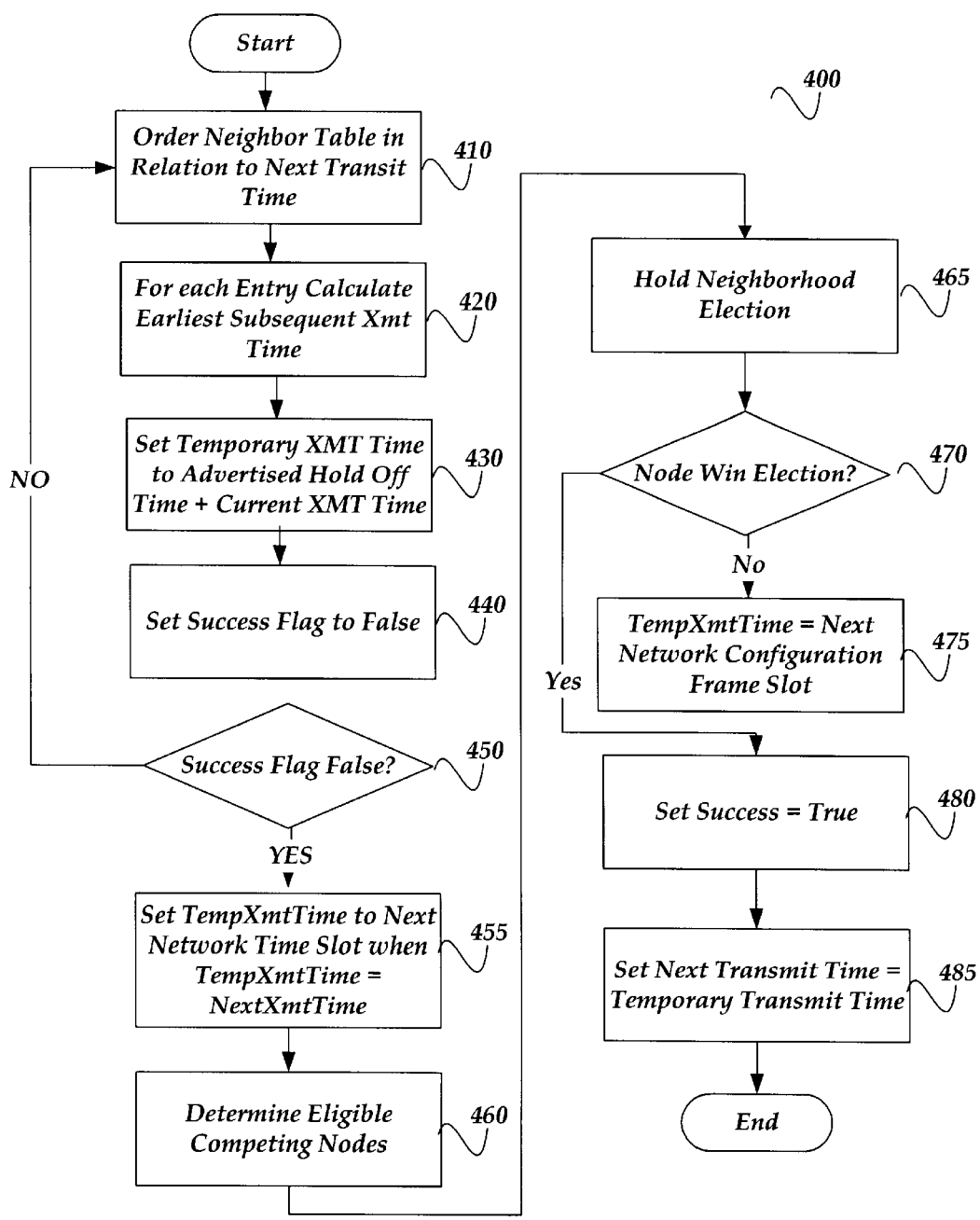
FIG. 4 illustrates a procedure for transmit scheduling.

FIG. 4 illustrates a procedure for transmit scheduling, in accordance with aspects of the invention. During the current transmit ("Xmt") Time of a node (i.e., the time slot when a node transmits its Network configuration packet), the node uses the following procedure to determine its Next Xmt Time.

After a start block, the logic flows to block 410, where the physical neighbor table is ordered in relation to the next transmit time. Moving to block 420, for each entry of the neighbor table, the node's Next Xmt Time is added to the node's Transmit Holdoff Time to arrive at the node's Earliest Subsequent transmit Xmt Time. Transitioning to block 430, the process sets the TempXmtTime equal to the node's advertised Xmt Holdoff Time added to the current Xmt Time. At block 440, the success flag is set equal to false. At decision block 450, a determination is made as to when the success flag equals false. When it does, the process moves to block 455 where if TempXmtTime equals the Next Xmt Time of any node in the Physical Neighbor List, then the process sets the TempXmtTime equal to next Network configuration frame/slot. Otherwise, the process moves to block 460, where the process determines the eligible competing nodes, which is the set of all nodes in the physical neighbor list with an Earliest Subsequent Xmt Time equal to or smaller than TempXmtTime. A neighborhood election is held among this set of eligible competing nodes using TempXmtTime as the seed and the MAC addresses of all eligible competing nodes at block 465. Flowing to decision block 470, a determination is made as to whether the node wins the election. If this node does not win the neighborhood election then the process moves to block 475, where TempXmtTime is set equal to next Network configuration frame/slot. Otherwise, the process sets success equal to true at block 480 and the process moves to block 485 where the node's Next Xmt Time is set equal to TempXmtTime.

In one embodiment of the present invention, the neighborhood election carried in the above procedure is the same as the election carried out in the REALM protocol (copending application Ser. No. 09/248,738, entitled "Adaptive Communication Protocol for wireless Networks," filed Feb. 10, 1999).

Figure 5:
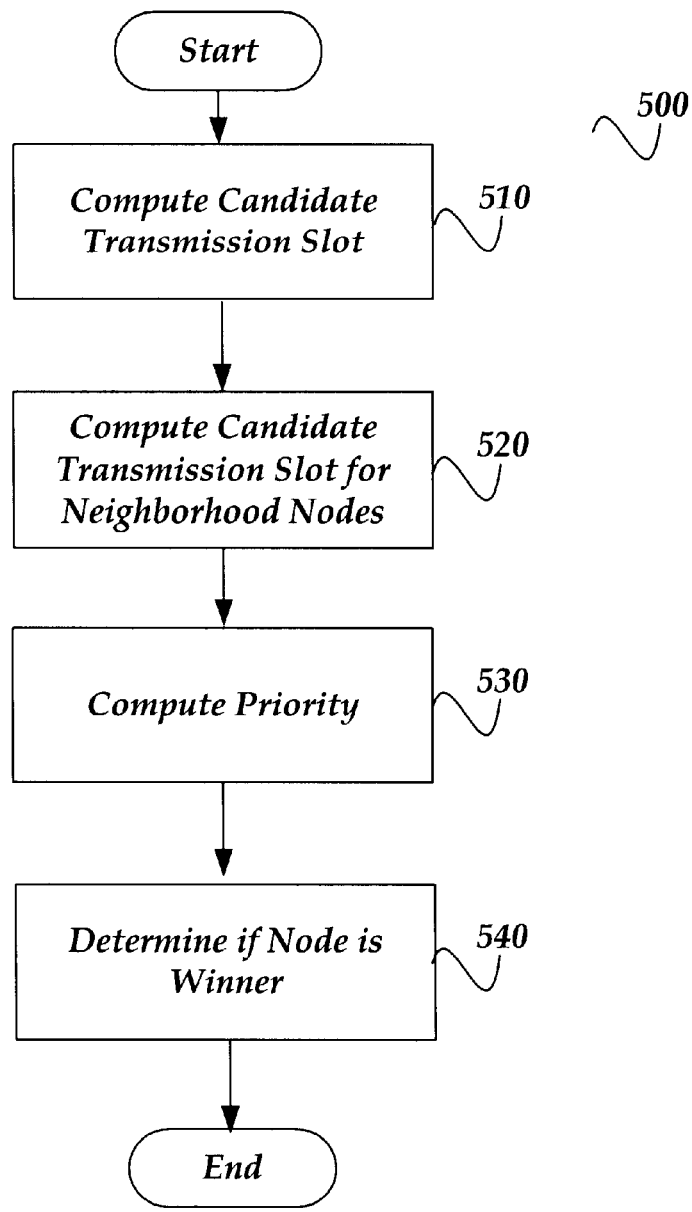
FIG. 5 shows a process for Basic Neighborhood Election.

FIG. 5 shows a process for Basic Neighborhood Election, in accordance with aspects of the invention. After a start block, the process moves to block 510 where, in each frame, each node (i) computes it's candidate-transmission-slot (CS (i)) by using a globally-known function (SlotFunc) that accepts the Network Age and a node's ID as inputs. This can be expressed as: CS(i)=SlotFunc (ID(i), NetAge).

Transitioning to block 520, each node computes the candidate-transmission-slot of each of the nodes (j) in it's 2-hop neighborhood, using their node IDs, the globally known Network Age, and the same SlotFunc function (CS (j)=SlotFunc (ID(j), NetAge)).

Of course, CS(k) for each node will give the same result, independent of which node is doing the computation (the local node, or one of the nodes in its 2-hop neighborhood). Therefore, each node is able to determine which, if any, of the nodes in its 2-hop neighborhood share the same candidate transmission slot. The IDs of these nodes are placed into node i's Contender Group (CG(i)) for this frame, according to: CG(i)=(j: CS(i)=CS(j)).

Flowing to block 530, each node (i) computes the priority PR(j) of each node in it's contender group to determine which node has priority for this frame among these contenders, using the node ID, scheduling frame number, and optionally, the node's priority bias, as inputs into a globally known Priority Function (PriorityFunc). This may be expressed by: PR(j)=PriorityFunc (ID(j), NetAge)+PB(j). The PriorityFunc(a, b) results in a number that is unique for each possible input "a". If priority bias's are not used, then PB(j) is set to 0.

Next, at block 540, node (i) will consider itself the winner of the contention if PR(i) is greater than any PR(j) in the contender group, or if PR(i) is tied for greatest, and would be the greatest if all priority bias's were 0.

Node (i) can transmit in its candidate-transmission-slot CS(i) in the current frame if it is the winner in its contender group, and if its PR(i) is equal to or greater than a PriorityThreshold.

The process then flows to an end block and returns to processing other actions.

Figure 6:
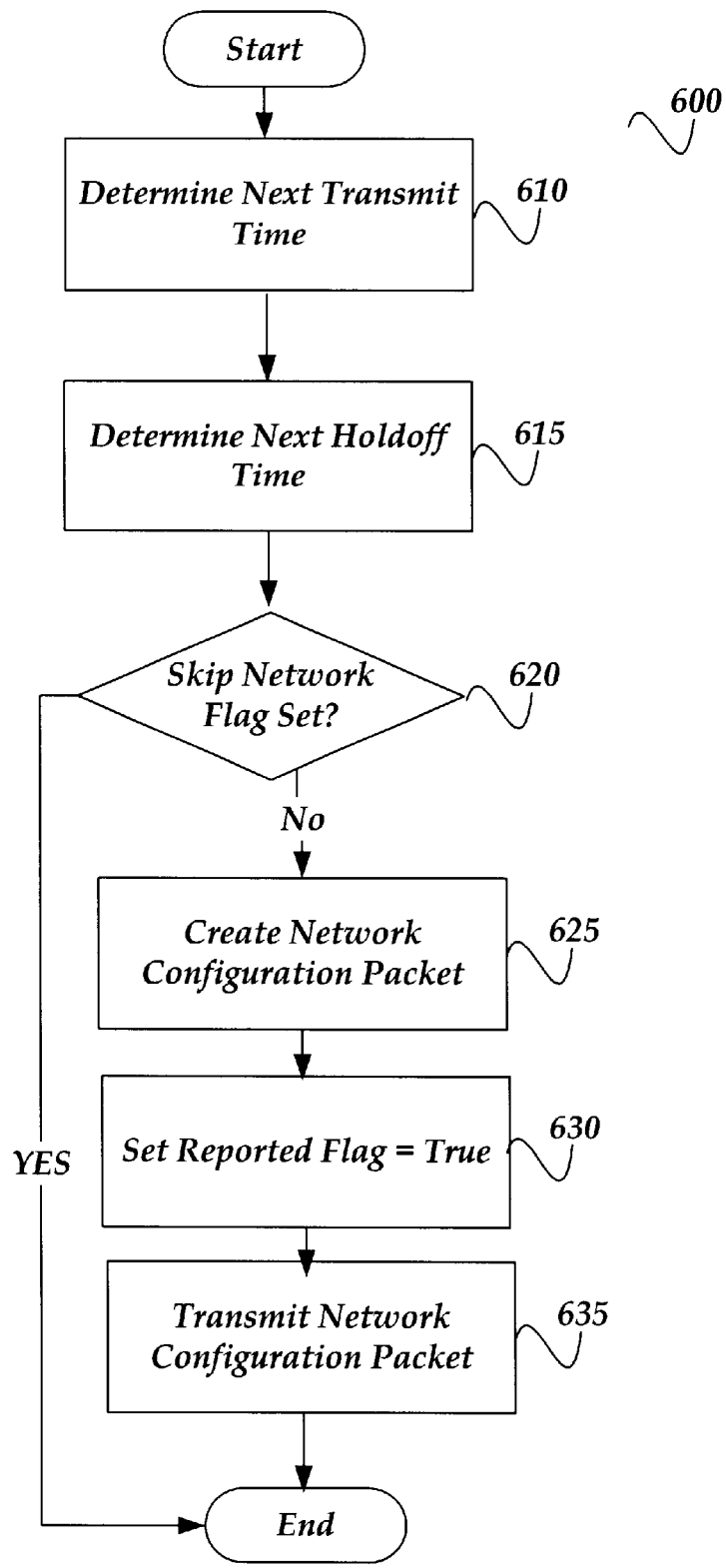
FIG. 6 illustrates a Network configuration Transmission Procedure.

FIG. 6 illustrates a Network configuration Transmission Procedure, in accordance with aspects of the invention. When the Next Xmt Time of the present node has been reached, the system performs the procedure as illustrated by FIG. 6.

After a start block, the process moves to block 610, where the process determines the Next Xmt Time of the node using the Xmit_Scheduling Procedure. Moving to block 615, the process determines its Next Holdoff Time (function based on the size of its Physical Neighbor Table, with some restrictions on how decreases are handled as described above).

Flowing to block 620, a determination is made as to whether the "SKIP THIS NETWORK CONFIGURATION TRANSMIT" flag is set. When the flag is set, then the process skips the remaining steps and moves to an end block where the process returns to processing other actions. Moving to block 625, the process creates (as described above) the Network configuration packet. Next, at block 630, the process sets the "Reported Flag" to TRUE for all neighbor entries being reported in either the round-robin list or the compressed list. At block 635, the network configuration packet is transmitted at appropriate frame/slot boundary.

Figure 7:
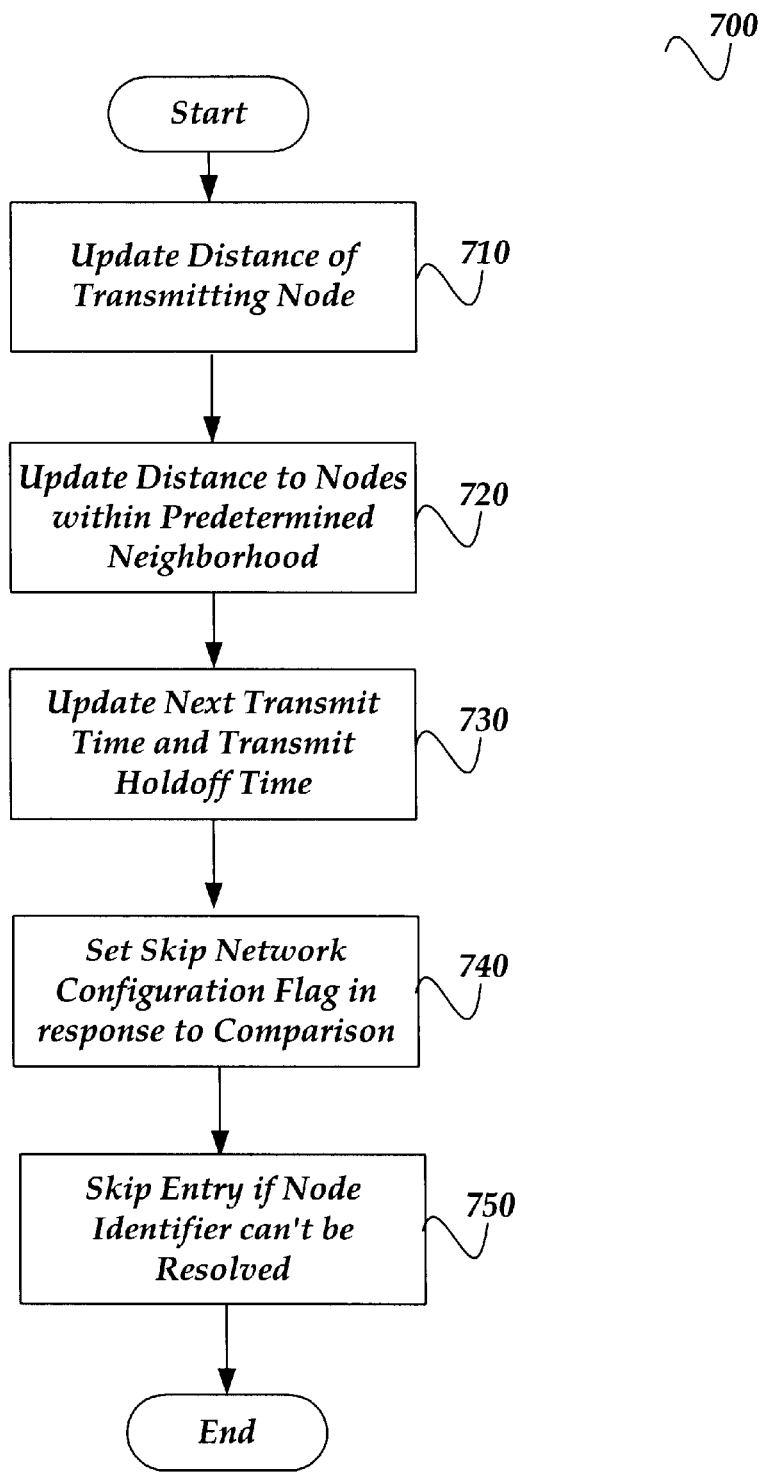
FIG. 7 illustrates a process when a Network configuration packet is received from a neighbor.

FIG. 7 illustrates a process when a Network configuration packet is received from a neighbor, in accordance with aspects of the invention. After a start block, the process moves to block 710 where the distance of the transmitting node is updated to 1-hop (direct) if necessary. Moving to block 720, for each reported node reached over a minimum number of hops through the neighbor, the distance to the reported nodes is updated to 1 plus what is reported. Transitioning to block 730, the Next Xmt Time and Xmt Holdoff Time of the transmitting node and all reported nodes are updated. Flowing to block 740, if any reported neighbor is found with a Next Xmt Time equal to the present node's Next Xmt Time, then a "SKIP THIS NETWORK CONFIGURATION TRANSMIT" flag is set (used above). This could occur as a transient condition with topology changes due to channel dynamics or mobility. Next, at block 750, if the Node Identifier for any reported node in the compressed neighbor list cannot be resolved to a neighbor entry (with MAC address) using the information in the Physical Neighbor Table, then skip this entry.

Figure 8:
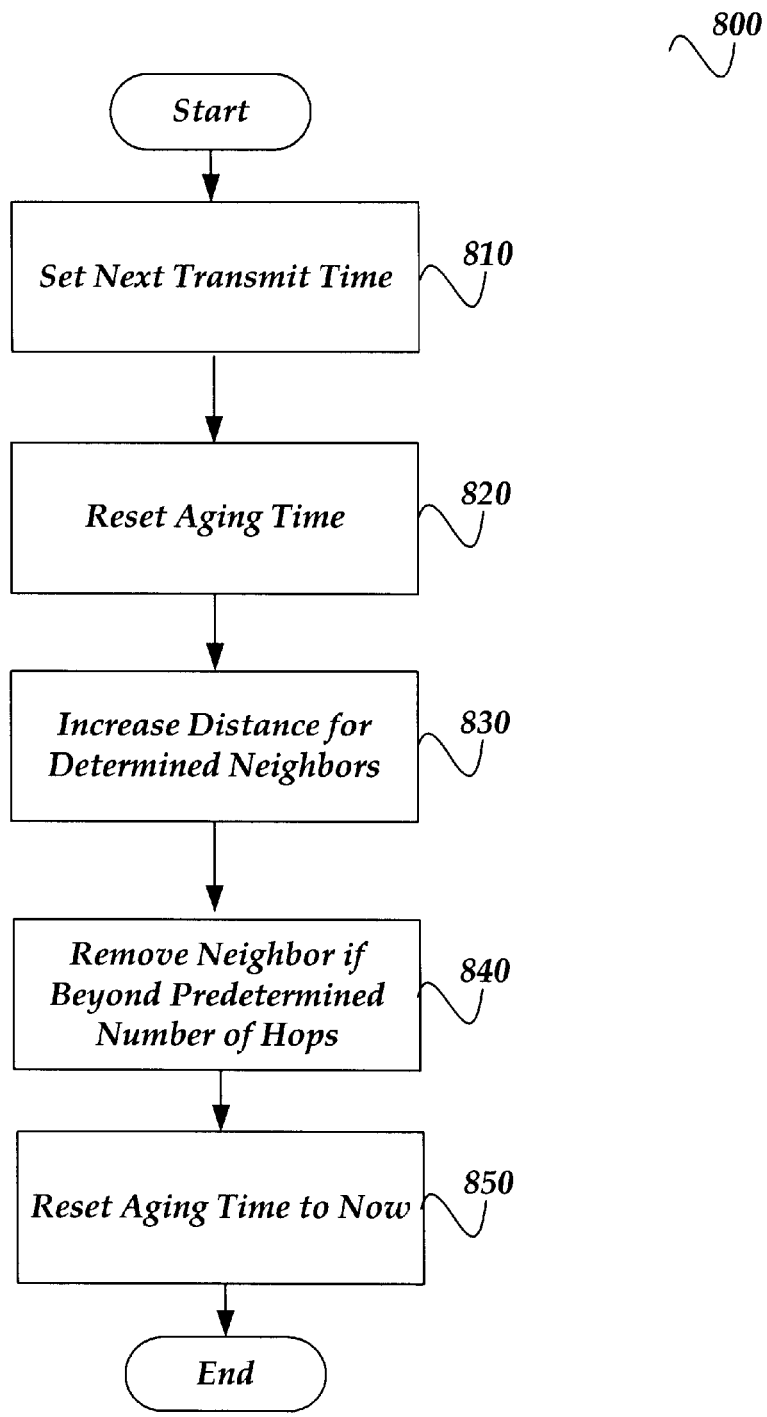
FIG. 8 illustrates a process for Physical Neighbor Aging.

FIG. 8 illustrates a process for Physical Neighbor Aging, in accordance with aspects of the present invention. Periodically, this procedure is run on the Physical Neighbor List. After a start block, the process moves to block 810 where for any neighbors with a Next Xmt Time plus its Xmt Holdoff Time which is equal to or less than the current time, the Next Xmt Time is set to NEXT_XMT TIME NOW. Moving to block 820, the entry's Aging Time is reset to now. Flowing to block 830, for any neighbors with a NEXT XMT TIME NOW and an Aging Time equal to some (TBD) time in the past, the distance to that neighbor is increased by one. Transitioning to block 840, if this increase makes the distance 3-hops (or 4-hops if in 3-hop scheduling mode), then the neighbor entry is removed. Otherwise, the process moves to block 850 where the neighbor entry's Aging Time is again reset to now.

Compression Methods

Next Xmt Time may be compressed in Network configuration packets to 3–4 bits giving the Next Xmt Time rounded down to some overall block boundary (with each block containing a number of Network configuration transmission opportunities). Xmt Holdoff Time may be quantized to perhaps 3 bits with a range of 16 to 2048 frames/slots using the formula: Xmt Holdoff Time=$2^{(x+4)}$ The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for distributed packed scheduling, comprising:

physical neighborhood list, wherein the physical neighborhood list is a data structure that is associated with a first node in an ad hoc network and includes a transmit time parameter, wherein the transmit time parameter is related to a time period in which the first node is not eligible to be selected as a transmitting node by a priority function; and a control packet that is transmitted in response to the transmit time parameter.

2. The system of claim 1, further comprising a compressor arranged to compress the physical neighborhood list.

3. The system of claim 1, wherein the control packet is a network configuration packet.

4. The system of claim 1, wherein the transmit time parameter is a transmit holdoff time.

5. The system of claim 1, wherein the transmit time parameter is a next transmit time.

6. The system of claim 1, wherein the transmit time parameter includes a transmit holdoff time and a next transmit time.

7. The system of claim 1, wherein the physical neighborhood list includes a reported flag associated with the transmit time parameter.

8. The system of claim 1, wherein the ad hoc network further comprises a plurality of other nodes, the first node and the plurality of other nodes are each arranged to perform the priority function, and wherein the priority function is configured to select a transmitting node among the first node and the plurality of other nodes.

9. A method for distributed packed scheduling, comprising:

determining physical network information associated with a first node in an ad hoc network, wherein the physical information includes a node identifier and a transmit time parameter, and wherein the transmit time parameter is related to a time period in which the first node is not eligible to be selected as a transmitting node by priority function;

creating a control packet in accordance with the physical neighborhood information; and transmitting the control packet in accordance with the transmit time parameter.

10. The method of claim 9, wherein the control packet is a network configuration packet.

11. The method of claim 9, wherein the control packet comprises:

distance parameter;

node identifier;

next transmit time, wherein the next transmit time is related to a time before which the first node will not transmit the control packet; and transmit holdoff time, wherein the transmit holdoff time is related to a time period in which the control packet is eligible to be transmitted.

12. The method of claim 11, wherein the control packet further comprises a MAC address.

13. The method of claim 9, wherein the control packet is configurable.

14. The method of claim 9, wherein the control packet is adaptive.

15. The method of claim 9, wherein the physical neighborhood information further includes a reported flag responsive to the transmit time parameter.

16. The method of claim 9, wherein the transmit time parameter is a transmit holdoff time.

17. The method of claim 9, wherein the transmit time parameter is a next transmit time.

18. The method of claim 9, wherein the transmit time parameter includes a transmit holdoff time and a next transmit time.

19. The method of claim 9, wherein the ad hoc network further comprises a plurality of other nodes, the first node and the plurality of other nodes are each arranged to perform the priority function, and wherein the priority function is configured to select a transmitting node among the first node and the plurality of other nodes.

20. A method for compressing a plurality of neighbor entries in a neighborhood list contained in a network configuration packet, comprising:

excluding a neighbor entry when the neighbor entry was reported in a round robin list, wherein the round-robin list comprises neighbor entries that are selected in a round-robin manner from a subset of the plurality of neighbor entries;

operating in a two-hop-scheduling mode and the neighbor entry is a three-hop neighbor entry; and a reported flag associated with the neighbor entry is set; and including the neighbor entry in a compressed neighborhood list if it has not been excluded, wherein the reporting flag is set to true upon transmission of the network configuration packet.

21. The method of claim 20, further comprising the step of ordering the compressed neighborhood list in accordance with the transmit time parameters associated with the neighbor.

22. The method of claim 20, wherein a value of the reported flag corresponds to whether a next transmit time has been reported, and wherein the next transmit time is related to a time period in which the network configuration packet is guaranteed not to be transmitted.

23. A method for transmitting a network configuration packet associated with a node in an ad hoc network, comprising:

determining a next transmit time associated with the node;

determining a next holdoff time associated with the node;

selecting a time for transmitting the network configuration packet based upon the next transmit time and the next holdoff time;

evaluating a skip transmit flag, wherein the skip transmit flag is associated with error correction, and if the skip transmit flag is false:

creating a network configuration packet, wherein the network configuration packet comprises a plurality of neighborhood entries;

for each of the plurality of neighborhood entries, setting a reported flag associated with the neighbor entry in accordance with whether the neighbor entry has been reported; and transmitting the network configuration packet.

24. A method for transmission scheduling in an ad hoc network comprising:

ordering neighbor entries in a physical neighbor list in accordance with next transmit times associated with neighbor entries;

calculating an earliest subsequent transmit time for each neighbor entry;

setting a temporary transmit time associated with a neighbor node equal to a value representing the sum of an advertised transmit holdoff time associated with the neighbor node and a current transmit time associated with the neighbor node;

holding a neighborhood election; and scheduling a next transmit time based on the neighborhood election.

25. The method of claim 24 wherein calculating the earliest subsequent transmit time further comprises adding the next transmit time associated with the neighbor entry to a transmit holdoff time associated with the neighbor entry.

26. The method of claim 24 wherein holding a neighborhood election comprises holding the neighborhood election among eligible competing nodes such that only eligible competing nodes compete in the election, and wherein the eligible competing nodes consist of neighbor nodes in the physical neighborhood list having an earlier subsequent transmit time equal to or less than the temporary transmit time.

27. The method of claim 26 wherein holding the neighborhood election further comprises:

determining the eligible competing nodes; and setting the temporary time equal to a next network configuration frame when the eligible completing node does not win the election.

28. The method of claim 27, further comprising:

determining when a first condition is satisfied, wherein the first condition is satisfied when the temporary transmit time associated with the node equals the next transmit time of a node in the physical neighborhood list; and setting the temporary transmit time equal to a next network configuration frame when the first condition is satisfied.

29. The method of claim 26, further comprising:

transmitting a network configuration packet at the scheduled transmit time, wherein the network configuration packet comprises a list of neighbor entries, each of the neighbor entries is associated with a node, and wherein each of the neighbor entries includes the next transmit time of the associated node and the transmit holdoff time of the associated node.

* * * * *

UNITED STATES PATENT AND TRADEMARK OFFICE
CERTIFICATE OF CORRECTION

PATENT NO. : 6,791,997 B2
DATED : September 14, 2004
INVENTOR(S) : David Beyer et al.

It is certified that error appears in the above-identified patent and that said Letters Patent is hereby corrected as shown below:

Title page,
Item [57], ABSTRACT,
Line 16, delete "ay" and insert -- may --.

Column 1,
Line 59, delete "Vt." and insert -- VT --.

Column 11,
Line 46, delete "E1->j" and insert -- Ei->j --.

Column 14,
Line 65, insert -- a -- before "physical".

Column 15,
Line 34, insert -- a -- before "priority".
Line 44, insert -- a -- before "distance".
Line 45, insert -- a -- before "node".
Line 46, insert -- a -- before "next".
Line 49, insert -- a -- before "transmit".

Column 16,
Line 11, delete "round robin" and insert -- round - robin --.

Column 17,
Lines 1 and 5, after "Claim 24" insert -- , --.
Line 14, after "Claim 26" insert -- , --.

Signed and Sealed this

Twenty-second Day of March, 2005

JON W. DUDAS
*Director of the United States Patent and Trademark Office*